April 28, 1964 — A. P. DE SEVERSKY — 3,130,945
IONOCRAFT
Filed Aug. 31, 1959 — 6 Sheets-Sheet 1

INVENTOR
ALEXANDER P. DE SEVERSKY

BY Strauch, Nolan + Neale
ATTORNEYS

April 28, 1964     A. P. DE SEVERSKY     3,130,945
IONOCRAFT
Filed Aug. 31, 1959     6 Sheets-Sheet 2
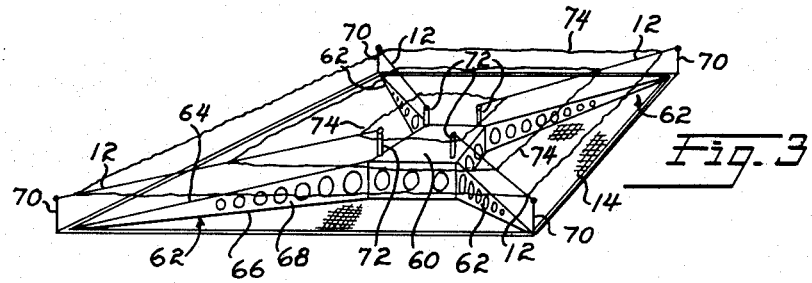
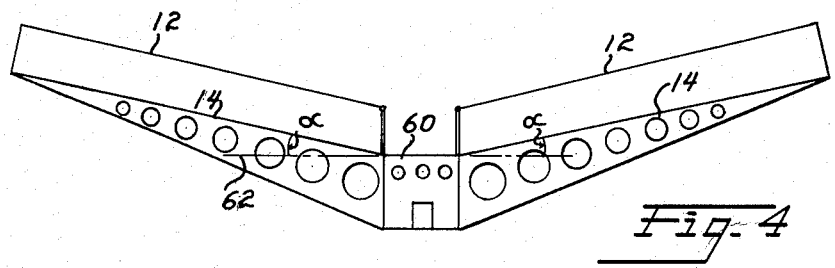
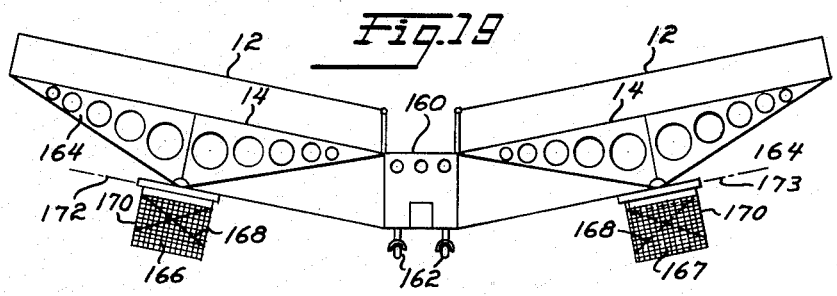
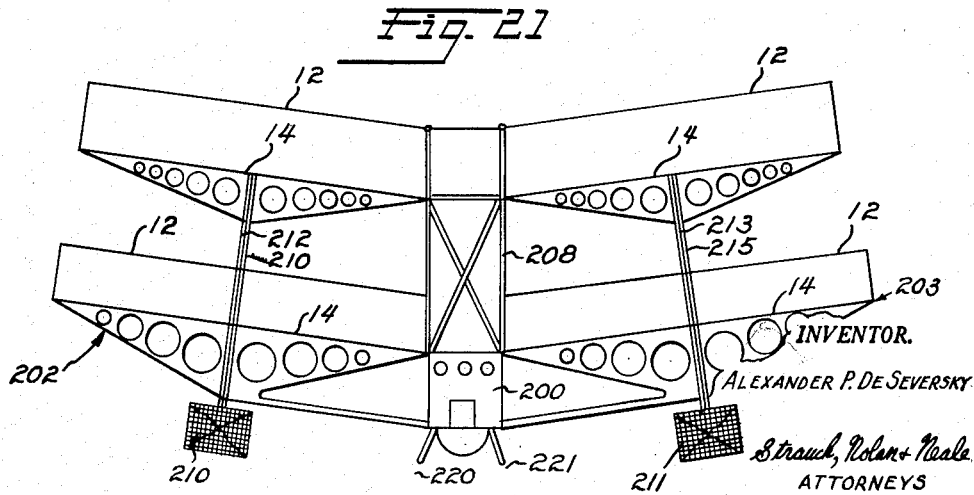
INVENTOR.
ALEXANDER P. DE SEVERSKY
ATTORNEYS April 28, 1964  A. P. DE SEVERSKY  3,130,945
IONOCRAFT
Filed Aug. 31, 1959  6 Sheets-Sheet 3

COLLECTING GRID

INVENTOR
ALEXANDER P. DE SEVERSKY

BY Strauch, Nolan & Neale
ATTORNEYS

April 28, 1964     A. P. DE SEVERSKY     3,130,945

IONOCRAFT

Filed Aug. 31, 1959            6 Sheets-Sheet 4

INVENTOR
ALEXANDER P. DE SEVERSKY

BY Strauch, Nolan Neale

ATTORNEYS

April 28, 1964 A. P. DE SEVERSKY 3,130,945
IONOCRAFT
Filed Aug. 31, 1959 6 Sheets-Sheet 5
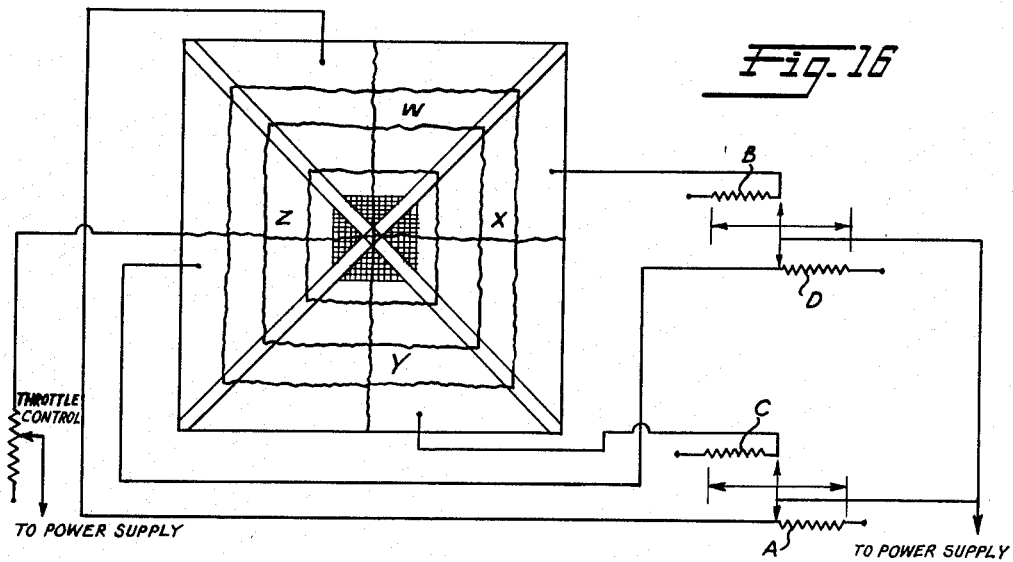
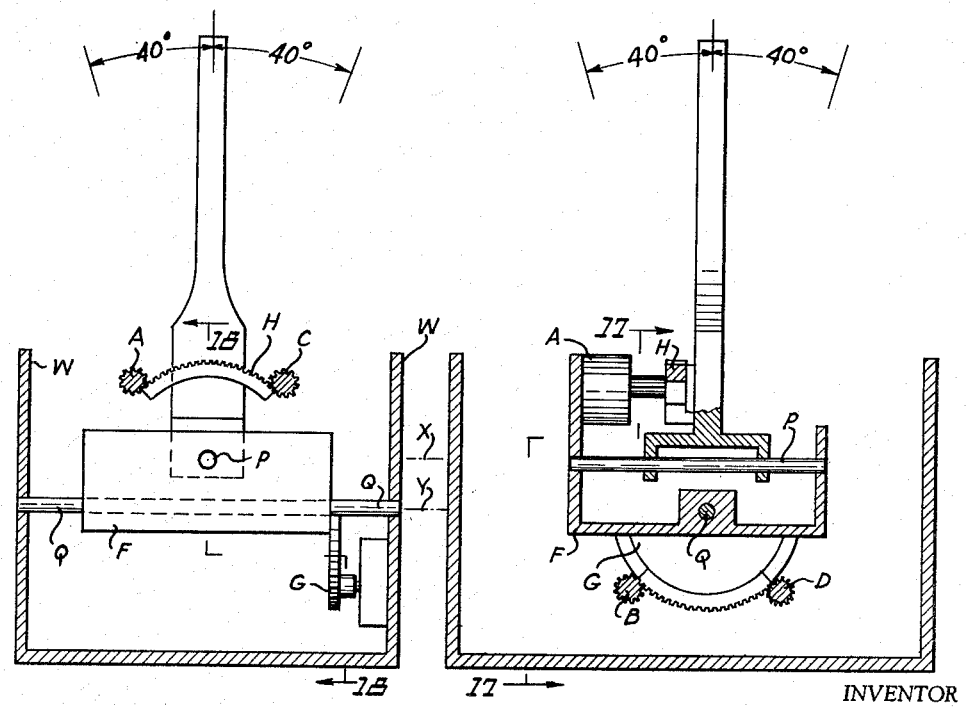
INVENTOR
ALEXANDER P. DE SEVERSKY
BY Strauch, Nolan + Neale
ATTORNEYS April 28, 1964
A. P. DE SEVERSKY
3,130,945
IONOCRAFT
Filed Aug. 31, 1959
6 Sheets-Sheet 6
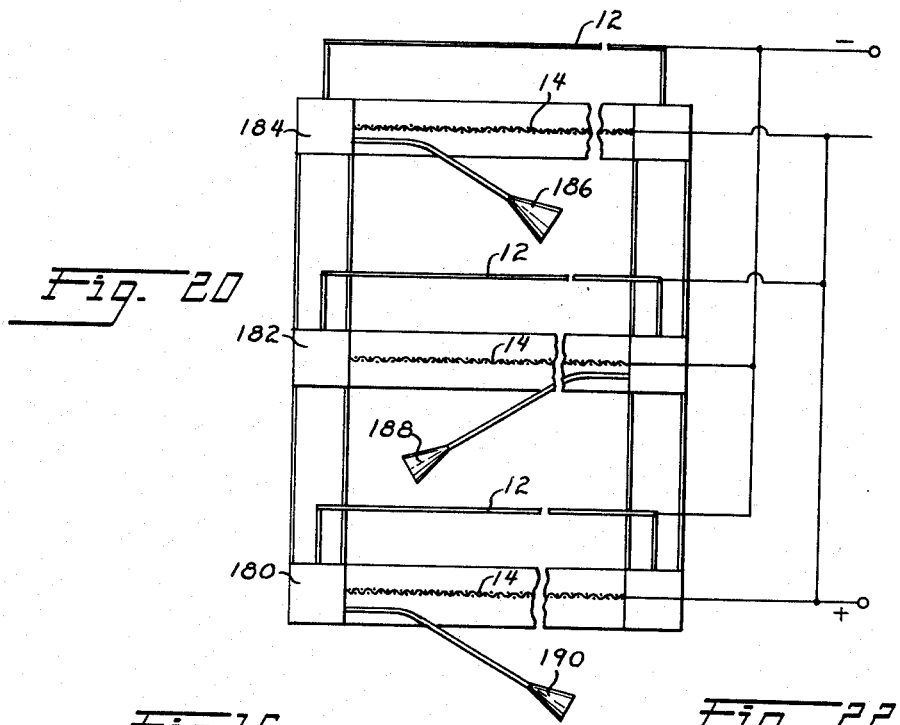
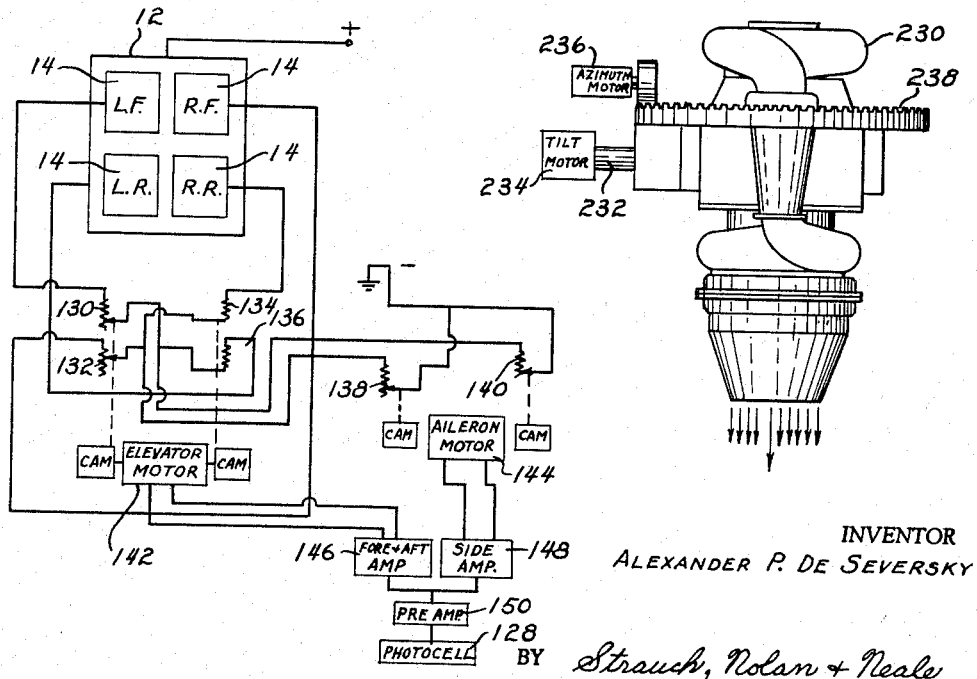
INVENTOR
ALEXANDER P. DE SEVERSKY
BY Strauch, Nolan + Neale
ATTORNEYS

United States Patent Office 3,130,945
Patented Apr. 28, 1964

3,130,945
IONOCRAFT
Alexander P. de Seversky, New York, N.Y., assignor to Electronatom Corporation, New York, N.Y., a corporation of New York
Filed Aug. 31, 1959, Ser. No. 837,150
29 Claims. (Cl. 244—62)

This invention relates to improved heavier-than-air aircraft, and more specifically to structures which are capable of either hovering or moving in any direction at high altitudes by means of ionic discharge.

The present invention is an improvement over well known electrostatic generation of winds used in a novel manner to supply propulsion and sustainance forces for a heavier-than-air aircraft. Crafts of the types herein disclosed having effective areas of several square feet have been successfully flown and contemplated platforms will inherently be of large size since the lift force is proportionate to the area through which large quantities or masses of air are accelerated downwardly from discharge electrodes to collection electrodes, the latter being a meshed-screen, bars, strips or any other structure that provides maximum collecting electrode area with perforations, slots or other types of opening to allow the air to pass through with a minimum of drag. Such a craft will be referred to in this application as an Ionocraft.

Such Ionocraft may serve as platforms which would be stationed above the earth for long periods of time and serve other purposes as will be explained below. The output power from microwave generators, such as magnetrons, coupled with high power capacity amplifier tubes may be beamed to the Ionocraft while airborne or the craft may carry its own power supply.

A principal object of the present invention is to provide a novel Ionocraft with space provided by the structure, preferably at the center of the craft, for installation of electronic equipment, and for the power plant, and crew where used.

Another object is to provide a novel Ionocraft construction wherein lightweight reinforcing members are provided to form a structure sufficiently rigid to cope with the dynamic and static loads and to maintain a desired distance between discharge emitting wires and the collecting grid.

Still another object resides in the novel configuration and arrangement of the emitting wires to assure uniform spacing from the collecting grid and to provide a maximum number of ionized particles for producing the desired lift.

A further object is to provide an improved Ionocraft of the foregoing type wherein some structural formation such as dihedral is provided for stabilizing the craft during flight. The dihedral may be positive or negative depending upon whether the hovering flight or horizontal motion of aircraft is a primary consideration of performance of the craft. A multiple deck structure may be used where desired to increase the lifting force, and dihedral may be provided in two or more angularly related directions to provide stability in all directions. A conical shape with the apex or nadir at the top or bottom center may also be advantageously used.

Still another object is to provide auxiliary ionic discharge structures mounted for rotational movement which are oriented to provide a horizontal propelling force and steering forces which can change the direction of the craft. By mounting such auxiliary structures to turn about a vertical axis, the craft can be made to turn in a horizontal plane about a vertical axis passing through the craft to thereby provide a scanning or target searching apparatus. A similar scanning motion can be achieved by mounting the auxiliary structures to turn about a horizontal axis.

A further object of this invention resides in the provision of a novel stick control using variable electrical impedances for control of the posture and for maneuvering the craft through variation of the voltage applied to different portions of the craft.

A second principal object of the present invention is to provide a combination Ionocraft and antenna system for radio frequency energy wherein the structure of the Ionocraft is so arranged as to serve in whole or in part as a structure of an efficient electromagnetic antenna system. In accordance with this object of the invention, the device contains one or more antennas that may be used for communication signal transmission, for detection, tracking and/or identification and for eventual destruction through collision of oncoming airborne or space vehicles or missiles and the like. The Ionocraft structure may be used, for example, as the main antenna element, as a series of directing or reflecting elements or as a parasitic element and may be shaped to provide arrays parabolas, corner reflectors, horns or lenses and be adapted to transmit a single or complete spectrum of frequencies from the extremely low frequencies to the highest frequencies including infrared.

Another object of this invention is to provide a combination antenna-Ionocraft with scanning means for detecting and/or tracking airborne vehicles or missiles. Such combination may also include suitable servo-control and other conventional equipment either on the Ionocraft or at a nearby ground station for causing the Ionocraft to "lock-on" automatically and/or be guided into the path of an "oncoming" vehicle or missile.

A further object is to provide an antenna which constantly locks on a radiation beam, such as a microwave or light beam for example, projected from the ground or from an aircraft in flight to change the position of the Ionocraft in flight.

These and other objects of the invention will become more fully apparent from the claims, and from the specification when read in conjunction with the appended drawings wherein:

FIGURE 3 (Sheet 2) is a pictorial view of a modified form of basic structure;

FIGURE 4 is a view in elevation of an embodiment similar to that shown in FIGURE 3 which is equipped with dihedral;

FIGURE 15 (Sheet 6) is a schematic diagram of a control circuit for causing the Ionocraft to lock-on and follow a radiation source at a ground station;

FIGURE 16 (Sheet 5) is a plan view, partly diagrammatic illustrating a control system for the craft of the present invention;

FIGURES 17 and 18 are side elevation views in section of a novel control stick box and assembly to permit steering and guiding of the craft by the system illustrated in FIGURE 16;

FIGURE 19 (Sheet 2) is a view in elevation of a craft having two vertical grid structure assemblies for controlling horizontal movement;

FIGURES 20 (Sheet 5) and 21 (Sheet 2) are side views in elevation of different embodiments each having several horizontal grid structures stacked one on top of the other; and FIGURE 22 is a diagrammatic view of a gas turbine engine and mounting which are adapted for use with craft of the present invention.

Figure 1:
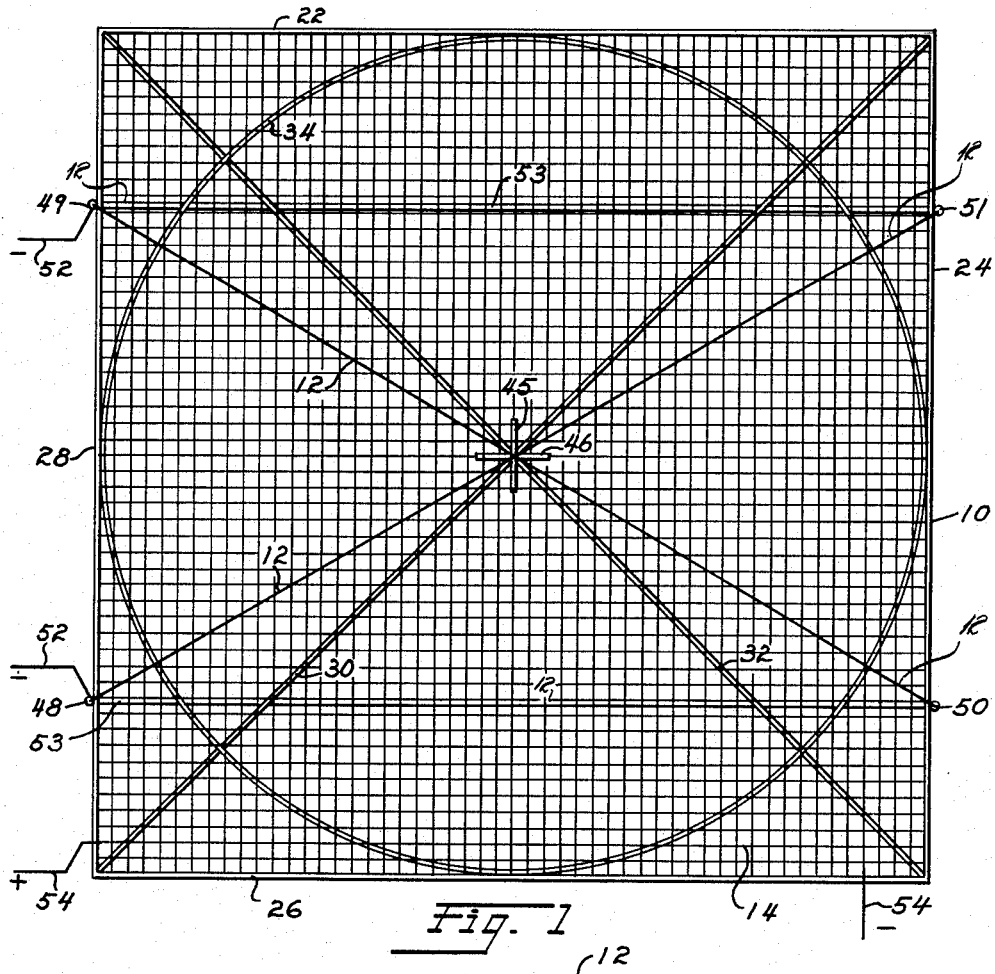
FIGURES 1 and 2 (Sheet 1) are top plan and elevation views of the basic structure of an Ionocraft made in accordance with the present invention.
Figure 2:
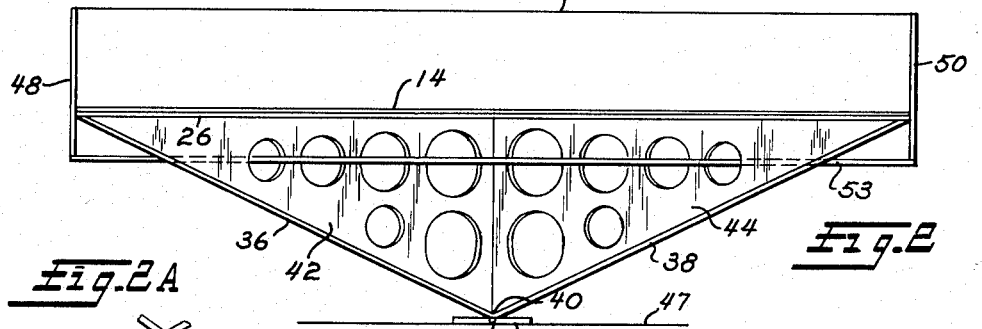

Referring now to the drawings, FIGURES 1 and 2 (Sheet 1) are plan and elevation views of a typical basic embodiment of my improved Ionocraft 10. The Ionocraft proper comprises a plurality of emitting electrode wires 12 mounted above and in a plane substantially parallel to the collecting electrode grid 14 which may be composed of a meshed screen, bars, strips or any other structure that provides maximum effecting collecting electrode area with perforations, slots or other types of opening to allow the air to pass through with a minimum of drag. A plurality of hollow, lightweight rods or bars of conductive material or crossed wires forming a mesh which is open to pass air downwardly, but with the wires sufficiently closely spaced to effectively neutralize the charged ions which pass from emitting electrode wires 12 are preferred structures. A high D.C. voltage is applied between emitting electrode 12 and collecting electrode 14; one pole or terminal of the high voltage generator is connected to the emitting electrode 12 and the opposite pole or terminal of the same generator is connected to the collecting grid electrode 14, thus creating a high potential field between the electrodes.

Figure 2A:
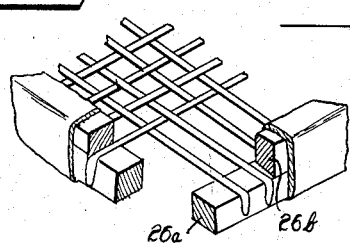
FIGURE 2a is an enlarged pictorial view of a portion of the structure showing how the grid wires are connected to the frame members.

In this form of improved Ionocraft, a basic structure sufficiently rigid to cope with the dynamic and static loads and to maintain a desired uniform distance between discharge emitting wires 12 and the collecting grid 14 is utilized comprising an outer square or rectangular frame composed of members 22, 24, 26 and 28. Diagonal frame members 30 and 32 extend between opposite corners of the rectangular frame and a circular frame member 34 is fixed tangentially to the midportions of the frame members. Said frame members are coplanar and collecting electrode wires 14 are interwoven, as with a loom, to form a closely meshed wire screen and supported from frame members 22, 24, 26 and 28. The ends of each wire are wrapped over and glued to the lower half 26a of the frame member and then cut off as shown in FIGURE 2A. The upper half 26b of the frame member is then secured in position as with glue. A considerable improvement in lifting force was achieved when the frame members and cut ends of the grid wires were covered with an aluminum foil.

Four lightweight rigid structural members, 36 and 38, of which two show in FIGURE 2, are mounted beneath the plane of collecting grid 14 in the vertical planes of diagonal members 30 and 32. Members 36 and 38 meet in a common junction 40 at the center of the Ionocraft. Four perforate lightweight rigid metal sheets or foils 42 and 44 of aluminum or the like, of which only two show in FIGURE 2, are mounted between diagonal members 30, 32, 36 and 38. These foils provide additional stabilization against tilting by guiding the air flow vertically along the surfaces of the foils and have been found to provide an increase in lift which more than compensates for their weight. Beneath junction 40, a pair of crossed support members 45 and 46 are provided to serve as a landing support to hold the craft with the collecting grid 14 above the ground-supporting surface 47 when landed.

The outer ends of emitting wires 12 are supported from masts 48, 49, 50 and 51 of insulating material mounted on opposite sides of the craft. In this embodiment, emitting electrode wires 12 pass diagonally across the craft and cross each other near the center. One terminal of a high voltage D.C. potential is connected to leads 52 which are connected to masts 48 and 49.

The lower edges of masts 48 and 50 and of masts 49 and 51 are connected together by tension member 53 (FIGURE 2) such as a lightweight cable to hold the masts in their vertical position by providing a force to balance against the tension force of emitting wires 12.

Suitable lead-in wires 54 are provided for connection between collecting grid 14 and the other terminal of the power supply, and are preferably at ground potential. Variable impedances, such as variable width spark gaps which serve to reduce the applied voltage, are provided in lead-in wires 54 for control of voltage between emitting wires 12 and collecting grid 14 to thereby control the vertical movement of the craft.

An actual embodiment built in accordance with the foregoing description which lifted itself into a self-sustaining flight had a collecting grid surface area of approximately 150 square inches and the space between the collecting grid and the emitting wires 12 was approximately 2 inches. With a craft having the foregoing dimensions, a voltage of 20 kv. and a current of approximately 0.5 milliampere was sufficient to make the craft more than self-sustaining. The total weight of the structure was approximately 5 grams. Other craft having the space between the collecting grid and emitting wires of 5 inches have been successfully flown. Such craft require voltages of the order of 50 to 60 kv. Where the grid area is about 7 or 8 square feet, currents of the order of 2 milliamperes exist. Variations in humidity and air pressure cause variations in the current drawn and in the lifting efficiency.

The lifting capability of the craft was found to increase as the diameter of the grid wires is increased. Crafts were tested with wire diameters of 2, 5, 8 and 12 mils for the collecting grid. With wire diameters of 8 mils or more, the current requirement to provide the same total lifting force shows a detectable decrease thereby indicating a higher efficiency. Hollow tubular conductors having an outer diameter of one-quarter inch also give substantially the same lift force and efficiency as the 8 and 12 mil wire diameters.

A modification of the foregoing structure is shown in FIGURE 3 (Sheet 2) wherein a central compartment section 60 is provided in the center of a surrounding large area collecting grid 14. A plurality of rigid support sections 62, each comprising an upper member 64, a lower member 66, and an intermediate foil 68 extend from the corners of the central section 60 to the periphery of the framework surrounding the collecting grid 14.

Near each of the corners of the outer periphery of collecting grid 14 a mast 70 made of insulating material is provided which supports the outer end of emitting wires 12. A second group of inner support masts 72 mounted on central section 60 provide support for the inner ends of emitting wires 12.

In this embodiment, the central compartment 60 is adapted to house electronic equipment and the power plant and crew where used.

In practice, it has been found desirable to increase the lengths of emitting electrode wires by adding a series of wires 74 which are supported on the main emitting wires 12 and which are parallel to each other and at a distance approximately equal to the distance of the emitting wires from the collecting electrode. The outermost wire is positioned inwardly about one-half the distance between the parallel wires (i.e., from 1 to 3 inches) from the outer frame member on the collecting grid to take full advantage of all the ionized particles which are produced. The radially directed emitting wires 12 are used to electrically connect the non-intersecting wires 74 together. However, the emitting wires 12 should be fewer and much less closely spaced than collecting grid wires 14 in order to avoid electrical symmetry. If the configuration of the emitting electrode wires 12 and the collecting electrode wires 14 are identical, no lifting force is provided.

A further embodiment is shown in FIGURE 4 (Sheet 2) which is identical with the form shown in FIGURE 3 except that the structure is equipped with positive dihedral for greater stability. Center section 60 is used as a center load carrying or cabin section and the rigid support sections are attached thereto so as to tilt upwardly to form a small angle α. Collecting grids 14 and their associated emitting electrodes 12 on opposite sides of center section 60 are thus angularly related.

Figure 5:
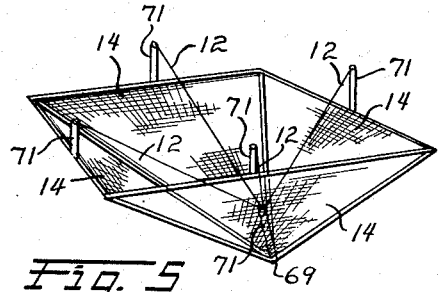
FIGURE 5 (Sheet 4) is a schematic view of a craft equipped with dihedral in two perpendicular directions.

This particular craft, because of its horizontal symmetry, is well adapted to be equipped with dihedral in the fore and aft direction as well as in the lateral direction. FIGURE 5 (Sheet 4) represents in an exaggerated schematic form an apparatus of this type. In FIGURE 5, the central section as shown in FIGURE 4 has been omitted and the four collecting grids 14 are of a triangular shape with the inverted apex or nadir 69 of the system at the bottom and center of the apparatus. Separate emitting wires 12 are mounted from masts 71 supported centrally of the side edges and at the nadir. Each of the four collecting grids may be insulated from each other by a gap or insulating material and variable resistance incorporated in their lead-in connections (not shown) to the power supply. By independently varying the resistance of the collecting grids the craft, which is here assumed rigid, may be tilted in any direction.

Figure 6:
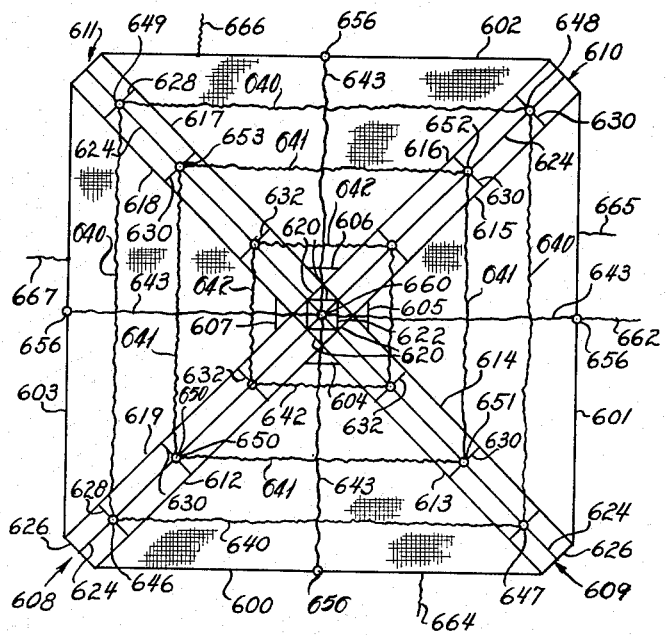
FIGURES 6 and 7 (Sheet 3) are top plan and side elevation views respectively of a further embodiment of the present invention which is equipped with negative dihedral.
Figure 7:
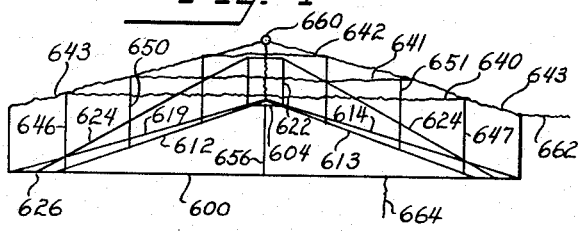

FIGURES 6 and 7 (Sheet 3) are top plan and side elevation views respectively of a further embodiment which has a negative dihedral. In this embodiment, the collecting grid frame comprises four outer peripheral lightweight wooden or metal members 600, 601, 602 and 603 which are mounted in a lower plane and four inner members 604, 605, 606 and 607 which are parallel to the respective outer members but in a plane higher than the plane containing the outer members. In an embodiment where the outer peripheral members were three feet long, the vertical distance between the planes carrying the inner and outer members was four inches. This negative dihedral has been found to provide greater stability during hovering flight than the positive dihedral though the positive dihedral appears to provide equally good stability for horizontal flight.

The collecting grid is divided into four equal areas by diagonally oriented frame assemblies 608, 609, 610 and 611. The collecting grid area visible in FIGURE 7 is bounded by rigid frame members 612 and 613 of diagonal frame assemblies 608 and 609 respectively and inner and outer frame members 604 and 600. The collecting grid, as pointed out above, may be a crossed grid of wires. The other three collecting grid areas are of identical size and construction.

Inside of inner frame members 604, 605, 606 and 607, no collecting grid screen is provided and the space may be left open or if desired, covered with a lightweight foil of insulating or conducting material. This air-tight foil forms a pocket under which a pressure appears to build up to provide added lift. The insulation material is preferred since this does not interfere with the electrical isolation between the four quadrants of the collecting grid which, as will be pointed out below, are used for guiding and/or propelling the craft.

Diagonal frame assembly 608 contains four cross braces 626, 628, 630 and 632 between frame members 612 and 613. The cross braces are made of an insulating material such as wood to thereby insulate each of the four grid sections from one another. Frame members 612 and 613 intersect and are secured together above and inwardly behind member 604. Members 614 and 615 also intersect and are secured together, as do members 616 and 617 and members 618 and 619. These points of intersection are joined together by four struts 620 shown in FIGURE 6. Secured to the centers of each of struts 620 is a four-sided chimney 622, each of the sides being flat sheets of a lightweight insulating material such as wood.

A center frame member 624 is mounted between the center of cross brace 626 and the top of chimney 622 along each of the diagonal frame assemblies. This construction gives adequate rigidity to prevent warpage of the collecting grid frame assembly.

The emitting wires are illustrated diagrammatically as waving lines and make up a pattern of three parallel wires 640, 641 and 642 and one transverse wire 643 across each grid area. Four supporting masts 646, 647, 648 and 649 are mounted on cross braces 628 and secured to center frame member 624 in each of the four diagonal frame assemblies 608, 609, 610 and 611. Emitting wire 640 is supported on the upper end of each of masts 646, 647, 648 and 649 with sufficient tautness to be substantially equidistant from the collecting grid at all points.

Four supporting masts 650, 651, 652 and 653 are mounted to cross braces 630 and center frame members 624 in each of the four diagonal frame assemblies for supporting emitting wire 641. Four additional masts (not numbered) are mounted to cross braces 632 and center frame members 624 to similarly support emitting wire 642.

At the mid-points of each of the outer frame members 600, 601, 602 and 603, masts 656 are mounted to support the outer end of emitting wires 643, which extend under and in electrical contact with each of emitting wires 640, 641 and 642 to a center mast 660 which is suitably mounted to the top of chimney 622.

One electrical terminal 662 for the emitting wires is shown on the right side of the craft of FIGURES 6 and 7. Four individual electrical terminals 664, 665, 666 and 667 are provided for each of the four grid sections. If it is not desired to control the posture and movement of the craft by the four separate sections, collecting grid terminals 664, 665, 666 and 667 may all be connected together.

Also, it is obvious that the four electrically separate sections could be achieved by using four insulated emitting wire sections, either with the four separate collecting grid sections or with all the collecting grid sections connected together.

The foregoing craft weighed about 100 grams and with a 5 inch spacing between the emitting wires and collecting grid, was self-sustaining with a voltage of about 50 to 60 kv. and a current on the order of 2 milliamperes.

Figure 8:
FIGURE 8 is a cross section of collecting grid structural members which may be used in lieu of the wire mesh.

Instead of using a crossed wire mesh construction for the collecting grid as shown in detail in FIGURE 1, it has been found that tubes of conductive material having an outer diameter of about one-quarter inch are equally as good. Such tubes may be made of aluminum foil wrapped around paper or may be hollow lightweight aluminum tubing or of a similar construction. For example, material such as an air-tight nylon base fabric having an evaporated metallic coating of for example aluminum may be fabricated in the form of tubes having a wall thickness of less than 1 mil and be adapted to be inflated with air or an inert gas to form a hollow lightweight tubular member. The cross section may be circular, oval or the like; a tear drop shape as illustrated in FIGURE 8 (Sheet 3) is a preferred configuration since air flow across the tapering lower edge provides additional lift. For the craft configuration as shown in FIGURES 6 and 7, the inflated tubes of FIGURE 8 are mounted parallel to each other and to the outer and inner frame members 600 and 604, or to their corresponding members in each of the other collecting grid sections, with their ends secured to the diagonal frame assemblies 608, 609, 610 and 611.

Figure 9:
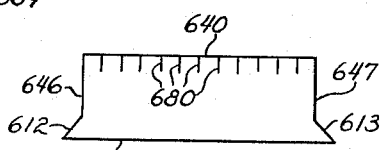
FIGURE 9 is a view in elevation of an emitting wire having short wires suspended from the main wire to provide a point source for ion emission.

Other emitting electrode constructions may also be used. For example, emitting wires 640–644 may have suspended from them a plurality of short wires 680 as shown in FIGURE 9 (Sheet 3) which provide a point of discharge rather than a line of discharge to thereby increase the efficiency of ionization. In FIGURE 9, only emitting wire 640 and its supporting masts 646 and 647 from the embodiment shown in FIGURES 6 and 7 are illustrated. It is to be understod that all of the emitting wires may be of similar construction to that illustrated in FIGURE 9. Each of wires 680 is about 1 to 3 or more inches in length and separated at least one inch apart. The lower ends of wires 680 are kept at a uniform distance from the collecting grid. This construction may offer some pre-ionization, though measurements show this emitting electrode construction to be about comparable to the use of plain wire as the emitting electrode.

Figure 10:
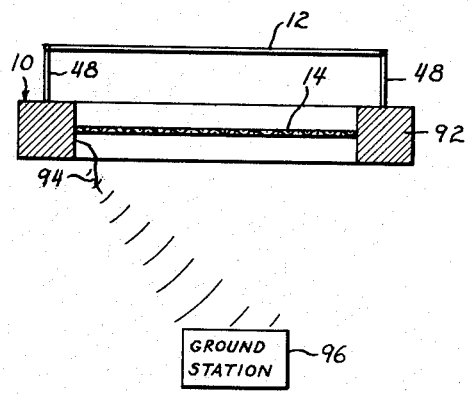
FIGURE 10 (Sheet 4) is a diagrammatic view in elevation of an Ionocraft in accordance with this invention.
Figure 11:
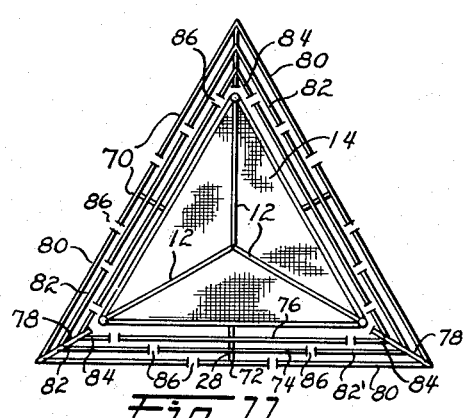
FIGURES 11 and 12 are top plan views of two embodiments of the Ionocraft having a side elevation view as illustrated in FIGURE 10.
Figure 12:
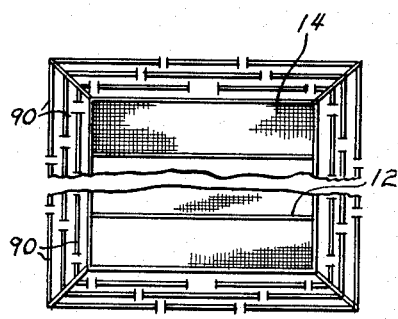

FIGURE 10 (Sheet 4) illustrates an elevation view, and FIGURES 11 and 12 illustrate plan views of modified triangular and rectangular shaped Ionocrafts 10 respectively. The craft of FIGURE 11 is triangular in configuration and is provided with emitting wires 12 suitably supported from masts 48 as illustrated. In practice additional emitting wires may be used. Collecting grid 14 extends over a large area beneath emitting wires 12 and may be formed of crossed wires as diagrammatically illustrated.

The electromagnetic energy antenna carried by the foregoing Ionocraft embodiments may comprise a series of generally horizontal, parallel conducting elements or dipoles 70 arranged along the basic side structure on which the wires 12 and 14 of the craft are attached. Dipoles 70 may be of differing length so that the antenna provided may receive or transmit several different frequencies. For frequencies of the order of 10 megacycles, for example, several dipoles 72, 74 and 76 may be arranged as a tuned array, such as the yagi array, with one or more dipoles 72 serving as a director, dipole 74 serving as the main antenna element and dipole 76 serving as a reflector. Such antenna is highly directional and with an Ionocraft of triangular configuration, the antenna may be used with signal transmission in three separate directions simultaneously.

The antenna wires 70–76 may be small diameter rods of a conductive material such as aluminum, supported on lightweight rods or bars 78 of either a conducting or insulating material, as dictated by conventional antenna construction techniques. Additional antenna elements 80, 82 and 84 may be present as metal rods or wires separated electrically from the adjacent antenna elements by insulators 86 of a suitable light material such as wood, plastic or the like, indicated on the drawing by spaces.

The various antenna elements 70–84 and insulators 86 may comprise a rigid frame forming the basic structure for the craft and inside of which the collecting grid 14 is supported and upon which the discharge electrodes 12 are mounted. The antenna elements 70–84 may be stacked vertically if desired to improve both the efficiency of the antenna and the rigidity of the basic structure. To the extent that the antenna elements may be galvanically connected together without interfering with the operation of the antenna in its conventional manner, the antenna elements are preferably connected to the same D.C. potential as collecting grid 14. Thus, the antenna elements may also augment the operation of the Ionocraft by neutralizing charged ions which provide the propelling force.

In the rectangular embodiment of FIGURE 12, the several antenna dipoles 90 have different lengths so as to be equal to one half the wave length $\lambda$ of the frequency being transmitted for an entire spectrum of frequencies having different wave lengths $\lambda_1, \lambda_2, \lambda_3 \ldots \lambda_n$. Since the length of a side of the Ionocraft may be several hundred feet or greater, such construction is ideally suited for communication systems, whether operating with high or low frequencies.

With either of the configurations of FIGURE 11 or FIGURE 12, the view in elevation will be substantially as illustrated in FIGURE 10 where the particular antenna structure is indicated schematically and designated by reference numeral 92. A ground station antenna which is indicated diagrammatically at 94 on FIGURE 10 may be provided for directing the signals downwardly to the ground station. Antenna 94 may be of any desired conventional type and connected on the Ionocraft to the main antenna structure 92 by a suitable transmission line such as coaxial cable, twin lead lines or hollow pipe waveguide, depending upon the particular frequencies utilized. Amplifiers or frequency converters may also be provided in the transmission line where signal strength is weak. The amplifiers and/or frequency converters may be powered by well known self-contained batteries or by the power supply unit for the Ionocraft (not shown).

Figure 14:
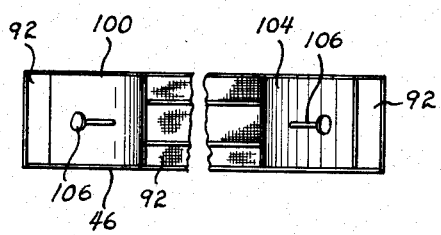
FIGURES 13 and 14 are top plan and elevation views of a further embodiment of this invention.
Figure 13:
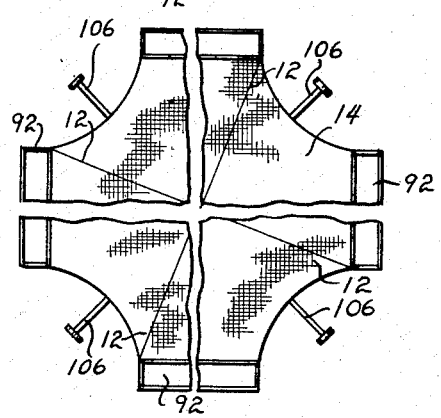

Referring now to FIGURES 13 and 14 (Sheet 4), a further embodiment of the invention is illustrated which has a plurality of side sections, four of which are shown curved. The contour of the curves may be parabolic or of any other shape as is conventionally used for antennas in high frequency systems such as radar or the like. In this embodiment, an outside frame of lightweight rigid members 96, 98, 100 and 102 is provided to define the contour of the antenna shape. Lightweight wires or rods 104 extend between members 95 and 102 to serve as part of the antenna. Lightweight sheet metal of a material such as aluminum may be used in lieu of wires 104 for the reflector surface if desired.

A plurality of horns 106 are illustrated in the drawings to effect simultaneous radar scanning through 360°. By oscillating the illustrated Ionocraft about its vertical center line through an angle of only 45° on each side of a center position, complete 360° scanning may be effected. Alternatively, the Ionocraft may be rotated continuously about its vertical center line and 360° scanning effected by one or more antennas. Such scanning may be effected by warped corners, reactive or propeller blasts of auxiliary power plant, or by auxiliary grids which are mounted for movement relative to the main lifting grid as will be described below. Scanning may be effected by other means as will become apparent from the following description. In lieu of or supplemental to some of the microwave antennas 106, antenna reflectors for infrared detectors may be carried on the Ionocraft. Such antennas serve to collect the infrared energy over a large area and focus such energy on a small infrared detector, and they may be of any conventional construction. The basic structure 10 between spaced antennas may contain such equipment to transmit via wireless signal channels to the ground station through ground station antenna 94, signals corresponding to the electromagnetic and radio frequency signals received.

Horizontal movement of the craft may be effected by the principles set forth in Serial No. 760,390 of Glenn E. Hagen filed September 11, 1958, by tilting the craft downwardly in the forward direction whereby the ionic propulsion force provides a horizontal force component to cause the craft to move in a horizontal direction. Tilting of the craft may easily be effected through variation of the voltage between emitting electrodes 12 and collecting grid electrode 14. For example, by electrically separating the craft into four sections of substantially equal size as illustrated in FIGURE 15 (Sheet 6), the voltage applied to two of the adjacent sections can be reduced by adding resistance in series with the current path and this will cause the lift produced by these two sections to decrease relative to the lift produced by the two other sections. Thus, horizontal movement of the craft may easily be controlled from the ground station.

For manual control of the posture and flight movement of the craft of the present invention, it has been found desirable to provide a control stick assembly which functions similar to that familiar to persons flying other types of aircraft. The control stick must function in both the longitudinal and lateral directions simultaneously and independently. Variable control elements such as potentiometers and variable transformers (powerstats for instance) may be used for control of the present invention. The posture of the craft may be controlled by dividing the collecting grid into three or more electrically separate regions as illustrated by the embodiment shown in FIGURES 6 and 7 and by individually varying the electrical potential to each of the separate regions. The potential may be increased to act as an elevator or may be decreased to act as a spoiler, and the voltage may be increased on one side while being simultaneously decreased on the other side to increase the effectiveness of the control.

Also, the emitting wires may be divided into three or more electrically separate regions and the electrical potential individually varied to each separate region. Again the potential may be increased or decreased, and may be simultaneously increased in one region and decreased in the opposite region.

To change the voltage to an individual region of the craft, a separate power supply for each region may be provided and the variable control element for changing the output voltage may be adjusted to produce the desired voltage level. Where a single power supply is provided, variable resistances may be placed in the electrical conductors leading to the appropriate terminals on the craft. If the craft is normally airborne with resistance present in the conductors, then increased voltage can be supplied to one region of the craft by decreasing the resistance in the conductor connected to that region. A decreased voltage can be supplied similarly by increasing the amount of resistance, and combination of increased and decreased voltages may be supplied to opposite sides of the craft to increase response of the craft to the controls.

One of the more simple ways to utilize the power supplied to the craft, I prefer not to have extra resistance in the power supply circuit of the emitting wires during normal flight and to control the posture of the craft by individually adding resistance into the circuit connected to each individual region of the collector grid. Such method of control has been found to provide adequate control of the Ionocraft and a control stick assembly will be described which utilizes variable resistance elements which are conventionally known as potentiometers or rheostats.

In FIGURE 16 (Sheet 5) the collecting grid construction as shown in the preceding embodiments (see for example FIGURES 6 and 7 on Sheet 3) is illustrated with each of the four grid sections W, X, Y, and Z connected through a separate correspondingly designated potentiometer to one terminal of the power supply. The emitting wires shown diagrammatically as waving lines are connected through a throttle control potentiometer, which is used to control the maximum voltage applied between the emitting wires and all of the collecting grid sections. When this voltage exceeds a certain level but yet remains less than that which causes arcing, the craft will rise. The effect of potentiometers A, B, C and D is to controllably reduce the voltage between the emitting wires and any one or two specific grid sections to thereby reduce or subtract from the effectiveness of that portion of the craft in producing its lifting force. This then causes the craft to tilt downwardly in the direction of whichever of the grid sections has the reduced voltage.

Referring now to FIGURES 17 and 18 (Sheet 5) front and side elevations of the control stick are shown with the respective shafts of the four potentiometers labeled A, B, C and D. On each of these shafts spur gears (not shown) are provided to be driven by gear segments secured to the stick.

The control stick is mounted for pivotal movement about pin P having axis X and about pin Q having axis Y beneath, but in the same vertical plane as axis X. Pin Q is mounted with its ends in opposite side walls W of the control stick housing.

The entire stick assembly shown in FIGURES 17 and 18 is mounted for unitary movement in a plane perpendicular to the longitudinal axis Y of pin Q. This assembly comprises bracket F which has secured to one side face spur gear G which need have only a segment thereof with teeth to mate with the pinion gears on the shafts of potentiometers B and D. The housings for potentiometers B and D are mounted on housing walls W, and the center of the gear segment on gear G coincides with axis Y of pin Q.

The ends of pin P are mounted in opposite sides of bracket B to enable the control stick to rock in a plane perpendicular to the longitudinal axis X of pin P. The lower end of the control stick is bifurcated as shown in FIGURE 18 and adapted to pivot about pin P. Gear segment H, having its center at axis X of pin P, is secured to the control stick for driving pinions on the shafts of potentiometers A and C which are mounted on bracket F.

The foregoing construction permits the control stick to function both in a longitudinal direction and in the lateral direction simultaneously to function as an electrostatic spoiler in the sense that when the craft is airborne, the addition of resistance in the lead-in wire to a particular grid section spoils the lift of that section to thereby control the posture of the craft in flight.

In the described embodiment, stick movement was limited to about 40° by mechanical stops not shown. The pitch diameter of each gear segment G and H was about 6 inches and the pitch diameter of the pinion gears on the potentiometer shafts was about 1 inch. The potentiometer gear shafts were capable of rotating through 240°, and were spring biased to a zero resistance condition.

As is apparent from FIGURES 17 and 18, the position of the pinion gears for the four potentiometers A, B, C and D is at the exact ends of the corresponding gear segments so that when the control stick is in its illustrated vertical position, each potentiometer is rendered ineffective to add any resistance to any of the collecting grid sections. As the control stick is tilted, one of the potentiometer shafts is rotated and there is absolutely no possibility that the potentiometer to the opposite grid section can be made effective at the same time because the partial gear segment and the spring loaded potentiometer shafts are used. The length of each gear segment must be at least as large as the maximum angle through which the stick can be moved, and the pinion gears are preferably at the precise ends of the gear segments.

It was found that if the potentiometer shafts were not spring loaded, the gears would upon occasion rotate slightly so the teeth did not always mesh when the stick was moved in a direction so that the gear segment should have engaged the potentiometer pinion. By the manual control stick just described, adequate tilt of the craft is readily achieved.

The position of the craft in air may be remotely controlled from a ground station through wireless control systems which may be of any suitable known type. The horizontal position of the craft may also be controlled automatically.

For example, the position of the craft of the present invention may be automatically controlled in space through means of suitable centering or tracking apparatus operating on well known principles, such for example as are disclosed in U.S. Patent Nos. 2,513,367 to Scott or 2,604,601 to Menzel. In such tracking apparatus, one form of which is diagrammatically illustrated in FIGURE 15 (Sheet 6), a beam of electromagnetic energy, such as light or infrared, is centered on a suitable photocell 128 which generates control signals that are used to control variable impedances to reduce the voltage applied to various sections of the craft to thereby control the position of the craft in accordance with the position of the beam source at the ground station.

FIGURE 15 illustrates in detail suitable horizontal positioning control arrangement. The common grid electrode 14 is connected to the negative terminal of the power supply and the emitting wires 12 are electrically separated into four sections, viz. left front LF, left rear LR, right front RF and right rear RR. Each of these sections is connected through variable impedances 130, 132, 134 and 136 respectively of the elevator control unit and the variable impedances 138 and 140 of the aileron control unit to the positive terminal of the power supply. The elevator motor 142 drives the movable contacts on variable impedances 130, 132, 134 and 136 and the aileron motor 144 controls in a similar manner values of the impedances 138 and 140. Each motor 142 and 144 may be driven by separate amplifiers 146 and 148 and pre-amp 150 in a manner as conventionally used in servo systems to position photocell unit 128 directly in alignment with a source of electromagnetic energy positioned on the ground.

Referring now to FIGURE 19 (Sheet 2), a craft having a central cabin 160 and equipped with dihedral is illustrated. The collecting grid 14 and emitting wire 12 construction may be similar to that described in connection with FIGURE 4 (Sheet 2) and be positioned on alternate sides of cabin 160. Beneath cabin 160, a suitable wheeled, skid or pontoon landing gear 162 may be provided.

Depending beneath frame members 164 and on opposite sides of cabin 160 are a pair of auxiliary grid assemblies 166 and 167 that are mounted to be operable in a generally vertical plane. Each auxiliary grid assembly 166 and 167 is provided with laterally spaced emitting wires 168 and a collecting grid within outer frame members 170 so that upon receipt of a suitable D.C. potential, a horizontal thrust is provided in the manner hereinbefore set forth.

Each auxiliary grid assembly 166 and 167 is mounted on frame members 164 for independent rotational movement about substantially horizontal axes 172 and 173. With the emitting wires 168 of both auxiliary grid assemblies facing in the same direction, the craft will proceed in the direction toward the emitting wires. With the emitting wires 168 of auxiliary grid assembly 167 facing in a rearward direction and emitting wires of grid assembly 166 facing in a forward direction as illustrated in FIGURE 19, the craft will revolve about an axis mid-way between the effective centers of the two grid assemblies. If the craft is simultaneously tilted in a cyclical manner, an effective radar antenna searching motion is provided which may include a large vertical angle as well as a 360° horizontal scanning operation.

Except where rotation of the craft for searching or scanning operations is a principal purpose for the craft, the emitting wires 168 of each auxiliary grid assembly 166 and 167 are mounted to face in the same direction. When landing or taking off, which is always accomplished in a vertical direction, auxiliary grid assemblies 166 and 167 are preferably pivoted into a horizontal plane. This not only retracts them to prevent interference with landing operations, but also provides a multiple deck structure to give additional lift and control of stability. Horizontal speed may be controlled by varying the angle of auxiliary grid assemblies 166 and 167 with the vertical.

As shown in FIGURE 20 (Sheet 6), the Ionocraft may comprise several decks 180, 182 and 184 each of which is of similar construction to the single-decked craft shown in FIGURES 10–14 (Sheet 4). Each of the basic structures 180, 182 and 184 may comprise different antenna types if desired. Several separate ground station antennas 186, 188 and 190 may be provided particularly where independent signals are transmitted and received by the several antennas of the Ionocraft.

In FIGURE 21 (Sheet 2), a multiple decked craft is illustrated which comprises a central cabin 200 from which two lifting grid assemblies 202 and 203 extend laterally on opposite sides which are equipped with dihedral. Above grid assemblies 202 and 203, one or more pairs of similar grid assemblies 204 and 205 are supported by a suitable superstructure 208. The turning axes 212 and 213 for auxiliary grid assemblies 210 and 211 in this embodiment are substantially vertical and extend through support members 214 and 215 to the upper grid assemblies 204 and 205 to provide added rigidity to the craft structure. Retractable antennas 220 and 221 may be provided beneath cabin 200 for establishing communication channels to the ground station (not shown).

In general, it makes little difference whether the emitting wires 12 are connected to the negative or to the positive terminal of the power supply. By tests, it has been determined that with emitting wires 12 connected to the negative terminal, there is an improvement of about 5% over that obtained when the emitting wires 12 are connected to a positive terminal.

In the multiple deck constructions, it is preferable to connect emitting wires 12 and collector grid wires 14 of the adjacent decks to opposite terminals of the high voltage generator as illustrated in FIGURE 20 (Sheet 6), thus making discharge or emitting wires 12 in alternate decks positive and the collector grids negative which is the reverse of the polarity shown in FIGURE 1. In that case, tilting is effected by varying either the negative or positive potential of the corresponding emitting electrode wires and grid sections to provide a rolling movement longitudinally and laterally.

All the above mechanisms and procedures provided for manual control can be utilized for automatic control actuated by an automatic pilot director through suitable servo-mechanisms.

The tilting of the craft in the case of embodiments like those diagrammatically indicated in FIGURE 15 (Sheet 6) and 16 (Sheet 5) provides forward gliding movements much in the manner that a helicopter is propelled in a horizontal direction. Where other means are used for horizontal propulsion, such for example the auxiliary grids shown in FIGURES 19 and 21 or in conjunction with propellers or jet stream, then the tilting will be used to maintain a desirable posture in space. All these movements may be controlled automatically by conventional stabilizing and steering mechanisms borne by the craft or such movement may be accomplished from remote transmitting points either on the ground or from another airborne craft.

The maximum size of crafts of the type here involved is theoretically unlimited, except for structural considerations, since the amount of lift provided increases continuously with area. It is thus contemplated that a particularly useful function of the craft of the present invention may be to serve as means for destruction through collision oncoming vehicles and missiles through air and space. Intercontinental as well as space missiles enter the atmosphere over a target area in predictable trajectories, the terminal end of which is a substantially vertical path. Thus, the large horizontal area of the craft of the present invention is particularly suitable for the purpose of protecting sensitive target areas such as large cities, naval task forces, troop concentrations and the like by its mere physical presence during hovering operations. By maneuvering the craft laterally it is possible to protect an area much larger than the area of the craft since present detection systems give identifying information of the target area about 15 minutes prior to arrival of the missile and the lateral movement of the craft may be effected at speeds of the order of 60 miles per hour, or more depending upon the horizontal propulsion system used. If the target area is vast, several Ionocraft could be maintained aloft to assure collision with oncoming missiles.

While the craft may be powered through conductors extending from ground or ship towers or via microwave power transmissions, it is contemplated that lightweight power plants such as gas turbines or the like, be used to drive suitable high voltage generators which are aboard the craft. As shown in FIGURE 22 (Sheet 6), turbine 230 may be so mounted that its exhaust is directed vertically downwardly to provide additional lifting force while providing shaft rotation for producing the electrical power for the Ionocraft. Turbine 230 is here shown to be mounted for pivotal movement about the axis of shaft 232 which is driven by a tilt motor 234 to change the direction of the exhaust gases from vertical toward a horizontal direction. The entire tilt motor 234, shaft 232 and turbine 230 assembly may be mounted to be rotated in azimuth by azimuth motor 236 driving annular ring gear 238. Thus, in emergency operations where maximum horizontal speeds are desired, motors 234 and 236 may be controlled to advance the craft at higher velocities.

Other types of convention airborne power plants, such as turbine propeller combinations, may also be utilized for providing additional lift and aiding in maneuvering in the atmosphere. The turbine of FIGURE 15 may be provided with a reverse thrust device or such propellers may have a reversible pitch, and steering may be accomplished by rudders or vanes located in the jet stream of the turbine. Also, high voltage generation by radio-active isotopes is another method of obtaining the necessary high voltage energy or a primary source of ionization for the propulsion and sustenance of the Ionocraft.

It is also contemplated that this craft may be supplied with electrical power transmitted to the Ionocraft while in flight by microwaves. It has been demonstrated 80% of the energy emitted from a ground station microwave antenna array can be collected in the form of heat by airborne vehicles. In this case, such heat may be readily converted into high voltage by conventional means such as turbines operating high voltage generators, suitable thermocouples and vibrator-transformer convertors or the like. The use of high power microwave amplifiers, such as Amplitrons (Raytheon Co.), for power transmission via microwaves can provide the requisite power for a craft of this type. Therefore, it may be not essential that a self contained power unit be carried by the craft for special uses.

In the preferred form of the craft adapted for military purposes, directional detecting apparatus such as radar or infrared equipment will be carried by the craft to enable an antenna on the craft to lock-on any target object in air and space for the purpose of guiding the craft into the path of such oncoming target object. An Ionocraft of sufficient lift capacity may carry its own computers to process the electromagnetic information to provide the necessary impulses to the controls of the propulsive means to place the craft in the path of collision. Such craft may also be guided from the surface of the earth or from an airborne vehicle in flight, by remote control means to accomplish the collision with an oncoming object.

Explosives may be carried by the Ionocraft for destroying such oncoming objects if the mass of the Ionocraft is inadequate for destructive purposes. Such explosives may be of any known type and adapted to be detonated either upon impact or by proximity fuses where desired. Other types of countermeasures or defensive devices for causing premature explosions of the warhead of a missile may be carried by the Ionocraft as occasions arise.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to cause air to move from said electrodes toward said grids to provide a propulsion force for said flying apparatus, and antenna means for use with radio frequency energy signals, said antenna comprising a plurality of elements which serve also as part of said structure for the flying apparatus by being connected electrically to one terminal of said high D.C. potential to assist in providing propulsion force for said apparatus.

2. In combination with flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to provide a propulsion force for said flying apparatus, an antenna for use with radio frequency energy signals, said antenna comprising a plurality of elements which serve also as part of said structure for the flying apparatus by being connected electrically to one terminal of said high D.C. potential to assist in providing propulsion force for said apparatus, and the flying apparatus structure having a configuration such that at least one side has a length greater than one-half the wave length of the radio frequency energy transmitted by the antenna.

3. The combination as defined in claim 2 wherein said antenna comprises a plurality of conductive elements having differing lengths whereby said antenna is tuned to different frequencies of radio frequency energy.

4. The combination as defined in claim 2 wherein said antenna comprises elements which serve as part of the mechanical structure of the neutralizing grid.

5. In combination with flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to provide a propulsion force for said flying apparatus, said flying apparatus having on a plurality of different sides thereof antenna means for directional transmission of radio frequency signal energy, the length of a side being greater than one-half the wave length of the signal energy being transmitted, and means for effecting a scanning movement of said antenna means by rotating said flying apparatus about a vertical axis.

6. In combination: flying apparatus comprising a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to provide a propulsion force for said flying apparatus; said apparatus being divided electrically into different sections with separate circuits individual to each of said sections for connecting said D.C. potential to the electrodes of the respective section; means including highly directional radiant energy sensitive means on said flying apparatus for receiving energy from an electromagnetic energy source at a control station, mounted on said apparatus for generating control voltages; and circuit means for connecting said control voltages to impedance varying means to reduce the voltage to various ones of the sections of said apparatus to cause said apparatus to assume a position determined by the energy source at said control station.

7. A system and apparatus for effecting destruction of flying vehicles including a flying apparatus composed of a large area structure supporting discharge electrodes for causing adjacent air molecules to become electrically charged spaced from a grid of electrical conducting means which neutralize the charge on electrically charged molecules whose charge was caused by said discharge electrode and means for applying a high D.C. potential between said electrodes and said grid to provide a propulsion force for said flying apparatus; tracking means carried by said flying apparatus for generating control signals, means responsive to said control signals for guiding said flying apparatus into the path of said flying vehicles and to effect destruction thereof by impact.

8. In flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to cause air to move from said electrodes toward said grid to provide a propulsion force for said flying apparatus, structural supporting means for said neutralizing grid separating said grid into two substantially equal sized grid areas, and means securing said grid areas in an angularly related position to equip said apparatus with dihedral for stabilization.

9. In flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to cause air to move from said electrodes toward said grid to provide a propulsion force for said flying apparatus, structural supporting means for said neutralizing grid separating said grid into two pairs of grid areas, the grid areas of each pair being of substantially equal size and on opposite sides of the apparatus, and means securing the grid areas of each pair in an angularly related position to equip said apparatus with dihedral in both longitudinal and lateral directions.

10. The apparatus as defined in claim 9 wherein each grid area is planar and the center of the craft is higher than the outer peripheral edges to thereby provide a negative dihedral.

11. The apparatus as defined in claim 9 wherein each grid area is planar and the center of the craft is lower than the outer peripheral edges to thereby provide a positive dihedral.

12. In flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to cause air to move from said electrodes toward said grid to provide a propulsion force for said flying apparatus, the improvement wherein the collecting grid comprises a plurality of lightweight thin walled tubes having an outer surface of conductive material, said tubes being inflated and spaced to provide neutralization of the charged particles and permit air flow between adjacent tubes.

13. In flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to cause air to move from said electrodes toward said grid to provide a propulsion force for said flying apparatus, the improvement wherein the discharge electrodes comprise wires of conductive material mounted above the neutralizing grid, and a plurality of short wires mounted on the discharge electrodes with free ends thereof suspended beneath the discharge electrodes at substantially equal distances from said neutralizing grid to thereby provide point sources for causing ionization.

14. In flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to cause air to move from said electrodes toward said grid to provide a propulsion force for said flying apparatus, an auxiliary discharge electrode and neutralizing grid structure supported by said flying apparatus for movement relative to said flying apparatus about a pivot axis for controlling the posture and direction of movement of said apparatus.

15. In flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to cause air to move from said electrodes toward said grid to provide a propulsion force for said flying apparatus, a pair of auxiliary discharge electrode and neutralizing grid structures supported at spaced positions on said flying apparatus, each of said grid structures being mounted for movement about pivot axes for controlling the posture and direction of movement of said apparatus.

16. Apparatus as defined in claim 15 wherein said pivot axes are in a horizontal plane.

17. Apparatus as defined in claim 15 wherein said pivot axes are vertical.

18. In flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to cause air to move from said electrodes toward said grid to provide a propulsion force for said flying apparatus, a rigid frame for said neutralizing grid including intersecting support members lying in a vertical plane, and air foil means secured to said intersecting support members to provide added stabilization to said apparatus.

19. In flying apparatus composed of a structure supporting discharge electrodes for causing adjacent air molecules to become electrically charged spaced from a grid of electrical conducting means for neutralizing the charge on electrically charged molecules whose charge was caused by said discharge electrode and means for applying a high D.C. potential between said electrodes and said grid to cause air to move from said electrodes toward said grid to provide a propulsion force for said flying apparatus, a polygonal rigid inner and outer frame for said neutralizing grid, a center portion of said grid surrounded by said inner frame being without the electrical conducting means forming the grid, and diagonally disposed frame assemblies extending between corners of said outer frame and said inner frame.

20. Apparatus as defined in claim 19 wherein the apparatus is provided with negative dihedral and the center portion is covered with an air foil to provide a pressure wave beneath the craft for added lift.

21. In combination a base member; bracket means supported on said base member for movement about a first pivot axis; a first gear segment on said bracket; a first pair of electrical circuit elements having parameters which are variable in magnitude by rotation of a shaft individual to each circuit element; a gear on each of said shafts; said gears being positioned at opposite ends of the gear segment on said bracket so that only one shaft is rotated from a reference position at any moment; a control stick mounted for pivotal movement on said bracket about a second pivot axis perpendicular to said first pivot axis; a second gear segment on said control stick; a second pair of electrical circuit elements similar to said first pair of electrical circuit elements mounted on said bracket means; and separate gears for controlling said second pair of electrical circuit elements, said gears being mounted at opposite ends of said second gear segment so that only one gear is rotated from a reference position at any moment.

22. The combination as defined in claim 21 wherein each electrical circuit element contains a shaft spring loaded to a reference position.

23. The combination as defined in claim 22 wherein the electrical circuit elements are variable resistances.

24. The combination as defined in claim 23 together with flying apparatus composed of a structure supporting discharge electrodes for causing adjacent air molecules to become electrically charged spaced from a grid of electrical conducting means for neutralizing the charge on electrically charged molecules whose charge was caused by said discharge electrode, said grid comprising four electrically isolated sections of substantially the same size, and means for connecting one terminal of a high D.C. potential source to said electrodes and a second terminal to each of the four sections of said grid through different ones of said variable resistances.

25. In apparatus for thrust generation in atmosphere, composed of spaced emitting and collecting electrodes energized with a voltage sufficiently high to be capable of causing ionization for effecting an ionic discharge from an emitting electrode to produce thrust on at least one of the electrodes of said apparatus arising from elastic molecular and particle collisions occurring in the space between said electrodes during molecule and particle movement in the direction from the emitting electrode to the collecting electrode, said collecting electrode being composed of crossed grid wires of conductive material forming an open surface that is generally normal to the direction of molecule and particle movement, the improvement wherein said crossed grid wires have a diameter of at least 8 mils.

26. The apparatus as defined in claim 25 wherein the collecting electrode ends are covered by a layer of conductive material.

27. In flying apparatus composed of a structure supporting discharge electrodes for causing adjacent air molecules to become electrically charged spaced from a grid of electrical conducting means for neutralizing the charge on electrically charged molecules whose charge was caused by said discharge electrode; and means for applying a high D.C. potential between said electrodes and said grid to cause air to move from said electrodes toward said grid to provide a propulsion force for said flying apparatus; the improvement wherein said neutralizing grid comprises outer peripheral frame members and a centrally positioned inner frame between which the conducting means comprising the neutralizing grid are mounted, and which are positioned in different horizontal planes to thereby provide the craft with dihedral; and said discharge electrodes comprise a plurality of substantially parallel wires, each mounted parallel to the outer peripheral frame members and in different horizontal planes so that all wires are substantially aquidistant from said neutralizing grid.

28. A system and apparatus for effecting destruction of flying vehicles including a flying apparatus composed of a large area structure supporting discharge electrodes for causing adjacent air molecules to become electrically charged spaced from a grid of electrical conducting means which neutralize the charge on electrically charged molecules whose charge was caused by said discharge electrode and means for applying a high D.C. potential between said electrodes and said grid to provide a propulsion force for said flying apparatus; auxiliary discharge electrode and neutralizing grid means mounted for pivotal movement for controlling the forward direction of movement; tracking means carried by said flying apparatus for generating control signals, means responsive to said control signals for guiding said flying apparatus into the path of said flying vehicles and to effect destruction thereof by impact.

29. A system and apparatus for effecting destruction of flying vehicles including a flying apparatus composed of a large area structure supporting discharge electrodes for causing adjacent air molecules to become electrically charged spaced from a grid of electrical conducting means which neutralize the charge on electrically charged molecules whose charge was caused by said discharge electrode and means for applying a high D.C. potential between said electrodes and said grid to provide a propulsion force for said flying apparatus; a gas turbine mounted on said apparatus with its exhaust gases directed downwardly during hovering operation and means for deflecting said exhaust gases in a direction providing a horizontal propulsion force to increase to the forward velocity of said apparatus; tracking means carried by said flying apparatus for generating control signals, means responsive to said control signals for guiding said flying apparatus into the path of said flying vehicles and to effect destruction thereof by impact.

References Cited in the file of this patent

UNITED STATES PATENTS

| | | |
|---|---|---|
| 2,495,748 | Matson | Jan. 31, 1950 |
| 2,503,109 | Harris | Apr. 4, 1950 |
| 2,598,064 | Lindenblad | May 27, 1952 |
| 2,613,887 | Woods | Oct. 14, 1952 |
| 2,842,645 | Dalgleish et al. | July 8, 1958 |
| 2,888,189 | Herb | May 26, 1959 |
| 2,892,949 | Hardy | June 30, 1959 |
| 2,949,550 | Brown | Aug. 16, 1960 |

FOREIGN PATENTS

| | | |
|---|---|---|
| 1,174,334 | France | Nov. 3, 1958 |